A. MARVIN.
LOADING APPARATUS.
APPLICATION FILED AUG. 22, 1907.
12,867. Reissued Oct. 20, 1908.
2 SHEETS—SHEET 1.
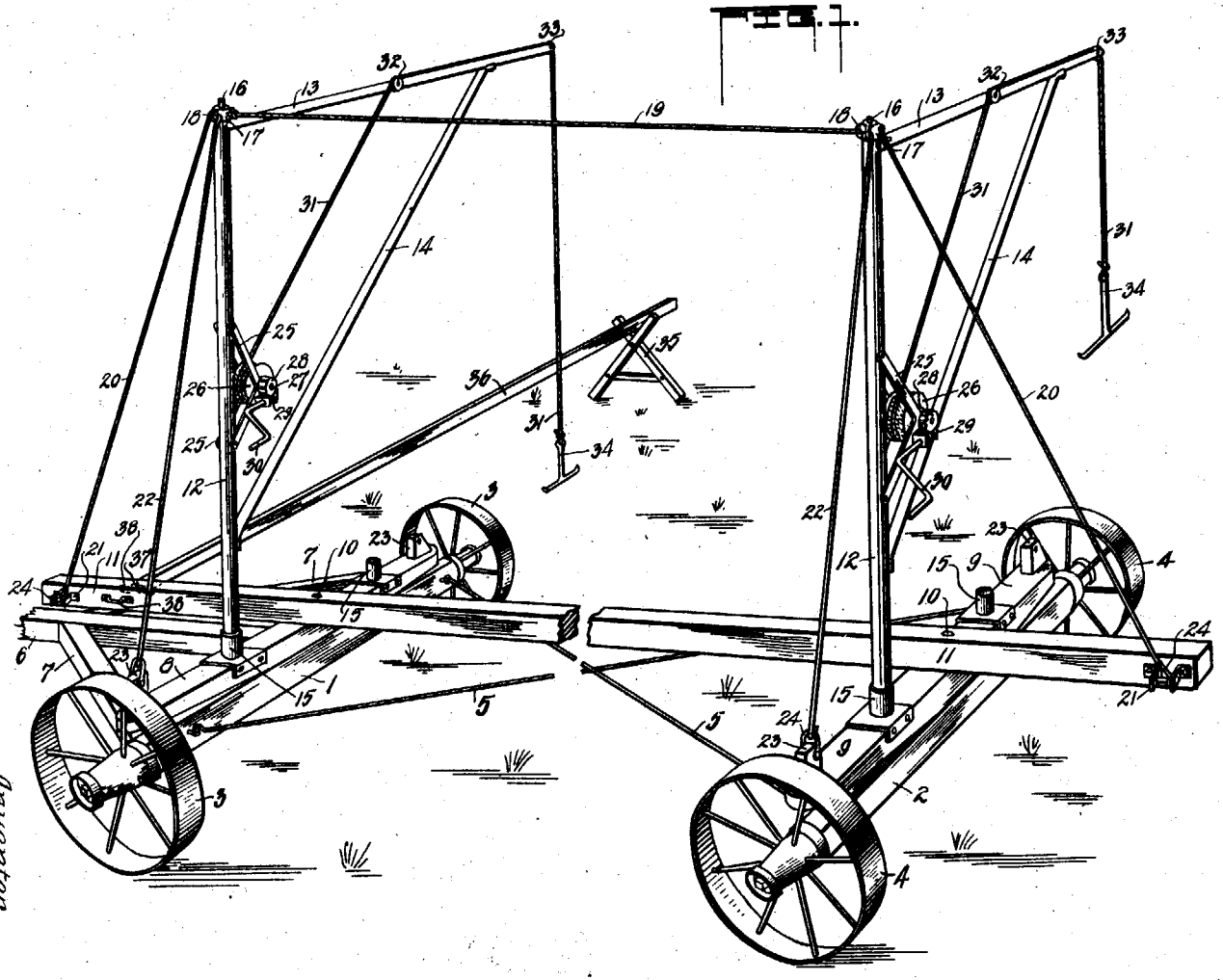
Witnesses:
Miles C. Fuller
Laura E. Claypool.
Inventor
Arthur Marvin
By Chas. A. LaPorte
Atty.
THE NORRIS PETERS CO., WASHINGTON, D. C.

A. MARVIN.
LOADING APPARATUS.
APPLICATION FILED AUG. 22, 1907.
12,867. Reissued Oct. 20, 1908.
2 SHEETS—SHEET 2.
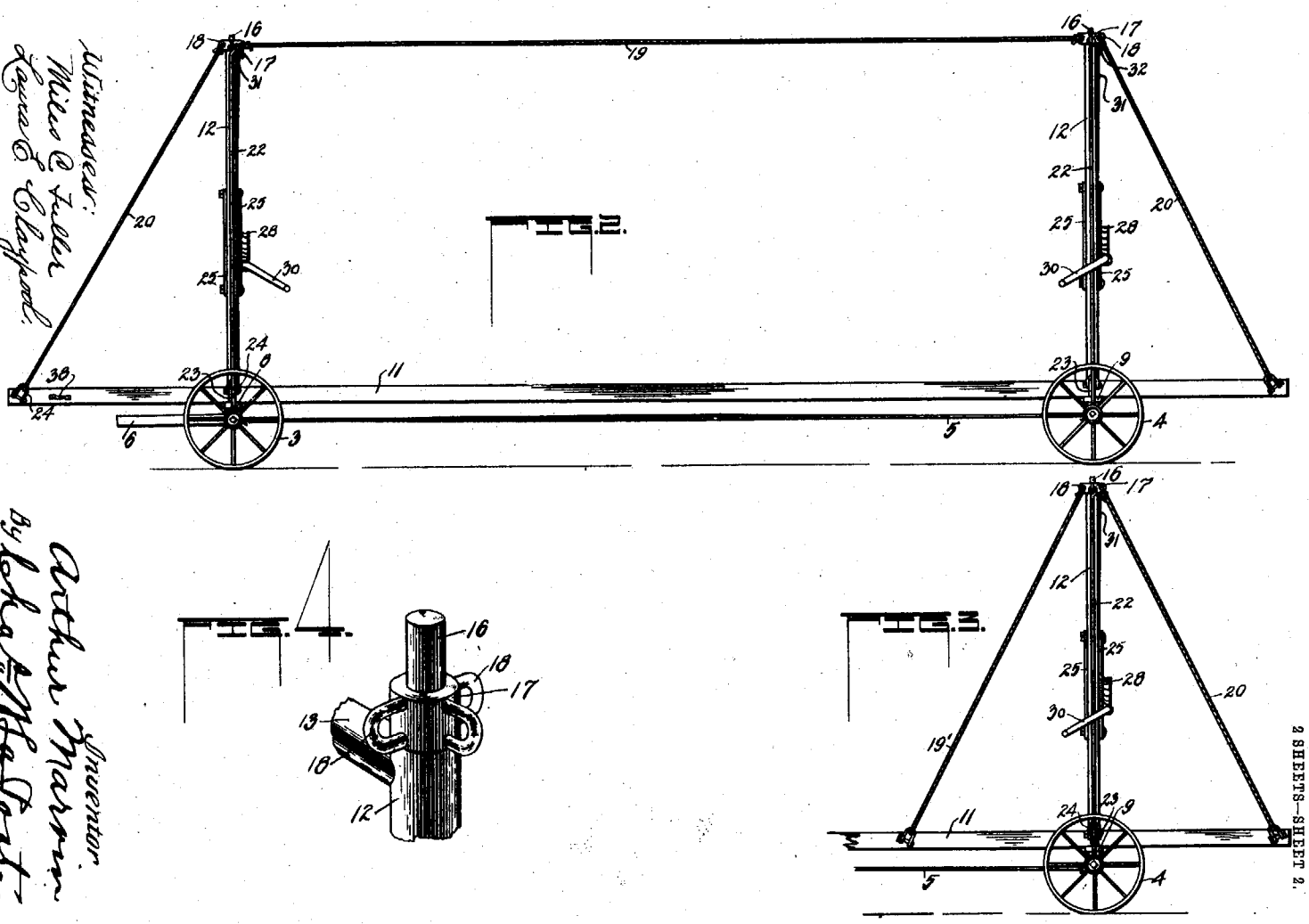
Witnesses:
Miles C. Fuller
Laura E. Claypool.
Inventor
Arthur Marvin
By Chas. A. Wright
Atty
THE NORRIS PETERS CO., WASHINGTON, D. C.

UNITED STATES PATENT OFFICE.

ARTHUR MARVIN, OF EL PASO, ILLINOIS, ASSIGNOR TO MARVIN MANFG. COMPANY, OF EL PASO, ILLINOIS, A CORPORATION OF ILLINOIS.

LOADING APPARATUS.

No. 12,867. Specification of Reissued Letters Patent. Reissued Oct. 20, 1908.

Original No. 831,015, dated September 11, 1906, Serial No. 300,873. Application for reissue filed August 22, 1907. Serial No. 389,756.

*To all whom it may concern:*

Be it known that I, ARTHUR MARVIN, a citizen of the United States, residing at El Paso, in the county of Woodford and State of Illinois, have invented a new and useful Loading Apparatus; and I do hereby declare that the following is a full, clear, and exact description of the invention, which will enable others skilled in the art to which it appertains to make and use the same.

This invention relates to an improved loading apparatus which is supported upon a running-gear and which is specially constructed and devised for the loading, transportation, and unloading of conveyers such as are used in connection with corn-shellers, said conveyers being oftentimes of great length and considerable weight, whereby their loading, transportation, and unloading by ordinary means are rendered difficult.

The object of the invention is to provide an apparatus which shall be simple, inexpensive, and efficient for the purposes set forth.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be made when desired.

In the drawings, Figure 1 is a perspective view of an apparatus constructed in accordance with the principles of the invention. Fig. 2 is a side elevation of the same. Fig. 3 is a side elevation of one end of the device, illustrating a modification. Fig. 4 is a perspective detail view of the upper end of one of the masts and the bearing-sleeve connected therewith.

Corresponding parts in the several figures are indicated throughout by similar characters of reference.

The improved loading apparatus is supported upon a running-gear which includes front and rear axles 1 2, having carrying-wheels 3 3 and 4 4, said axles being connected with each other by means of crossed rods 5 5, enabling short turns to be made, said rods serving to connect the axles in place of the ordinary reach. A tongue 6 has been shown connected with the front axle by means including the hounds 7.

Bolsters 8 9 are pivotally supported upon the axles 1 2 by means of vertical pins or bolts 10, which also serve to secure in position the sill 11, which latter is thereby pivotally connected with the bolsters and the axles. Each of the bolsters supports, near one end thereof, a mast 12, having a derrick-arm 13, which is reinforced by an obliquely-disposed brace 14. Each of the bolsters is provided with a pair of sockets 15, in which the lower end of the mast may be stepped for rotation, said sockets being located intermediate the sill, and the ends of the bolsters and the mast being capable of being readily shifted from one to the other of said sockets. The upper extremities of the mast have terminal pintles 16, for which bearing-sleeves 17 are provided, each of said bearing sleeves being provided with a plurality of perforated ears or lugs 18. A stay-rope 19 is connected with one of the lugs 18 of each of the bearing-sleeves. A guy-rope 20 extends from another lug 18 of each of the bearing-sleeves to points of attachment, as at 21, near the ends of the sill. Still other lugs 18 of the sleeve 17 are connected by guy members 22 with stakes 23 at the ends of the bolsters. It will be noticed that the bolsters are provided with stakes 23 at each end thereof and that the guy members 22 are connected with the stakes opposite to those above which the derrick-arms 13 are extended. The guy members 20 and 22 are preferably connected with the sill and with the stakes by means, including clevises 24, which enable said guy members to be conveniently disconnected and attached, as may be required, this being essential in order to permit the masts to be readily shifted from the sockets at one side of the sill into the sockets at the opposite side.

The masts 12 have been shown as provided with brackets 25, sustaining windlasses which in the form illustrated in the drawings include winding-drums 26, mounted upon shafts 27, having worm-gears 28, meshing with worms 29 upon crank-shafts 30, whereby the drums may be readily rotated to wind or unwind the flexible members 31, which are suitably guided over pulleys 32 and 33 upon the derrick-arms and which at their extremities carry hooks 34, which may be readily made fast to the object that is to be lifted. It is to be understood, however, that windlasses of any well-known and approved construction may be used in connection with the improved apparatus within the scope of the invention.

While in the foregoing description stay-ropes and guy-ropes have been referred to, it is to be understood that rods may be substituted, if desired.

As illustrated in Fig. 3 of the drawings, the stay member 19 may be omitted and guy members, as 19′, may be substituted, said guy members being connected directly with the side of the sill.

In connection with the derrick device there is used a trestle 35, having an arm 36, provided with a terminal hook 37, whereby it may be connected with a staple, as 38, at either side of the sill. The object of this device will be presently set forth.

From the foregoing description, taken in connection with the drawings hereto annexed, the operation and advantages of this invention will be readily understood. The masts may be readily stepped in the sockets 15 at the side of the sill distant from the object that is to be loaded. By manipulating the windlasses the hooks 34 are lowered until they may be connected with the object to be lifted. The windlasses are then operated to lift the object until the latter may be sprung over the wheels and be deposited upon the running-gear, it being preferably supported upon the sill 11. In like manner the derricks may be utilized to unload the object when desired.

As hereinbefore stated, this improved apparatus is designed especially for the handling and transportation of conveyers for corn-shellers, said conveyers consisting of troughs which are sometimes made of great length and which are consequently unwieldy, heavy, and difficult to handle. By using connecting-rods 5 and a sill 11 of suitable length the running-gear of this improved apparatus may be utilized for the transportation of conveyers of any length, convenient means being provided whereby such conveyers may be loaded, unloaded, and otherwise advantageously manipulated.

In unloading a conveyer the trestle 35 is connected with the sill in the manner described, and the arm 36 will thus serve to support the end of the conveyer that is to be connected with the corn-sheller in approximate position to enable the connection to be conveniently made or established without a preliminary heavy lift to bring the conveyer into the proper position. The trestle, as will be readily understood, may be quickly and conveniently connected with the side of the sill where the conveyer is to be unloaded.

Having thus described the invention, what is claimed is—

1. A running-gear including bolsters, a sill pivotally supported upon said bolsters, sockets upon the bolsters intermediate the sill and the ends of the bolsters, masts stepped for rotation in the sockets at one side of the sill and having derrick-arms, stay means connecting the masts, guy means connecting the masts with the ends of the sill and with the bolsters said guy means including clevises, windlasses supported upon the masts, and flexible hoisting members connected with the drums of the windlasses and guided over pulleys upon the derrick-arms.

2. A device of the class described including a running-gear, bolsters, a sill pivoted upon the bolsters, sockets upon the bolsters intermediate the sill and the ends of the bolsters, masts stepped for rotation in the sockets at one side of the sill and having derrick-arms, windlasses supported upon the masts, and flexible hoisting members connected with the drums of the windlasses and guided over pulleys upon the derrick-arms; in combination with a trestle having an arm adapted to be detachably connected with the sill.

3. A running gear, comprising front and rear axles, a bolster mounted on each axle, a supporting sill connecting said bolsters and axles centrally thereof, a mast for each bolster, capable of having an interchangeable connection with opposite ends thereof, raising and lowering means in connection with said masts, and mechanism supported by said masts for operating said raising and lowering means.

4. A running gear, comprising front and rear axles, a bolster mounted on each axle, a supporting sill connecting said bolsters and axles centrally thereof, a mast for each bolster, said masts adapted to have an interchangeable and revoluble connection with the opposite ends of said bolsters, a derrick arm attached to swing with each mast, raising and lowering means in connection with each derrick arm, and mechanism supported to rotate with said masts for operating said raising and lowering means.

5. In combination, an axle, a bolster mounted thereon, a mast, means for connecting the lower end of the mast to rotate on said bolster, means for sustaining said mast in an upright position, a derrick arm connected to swing with said mast, a drum mounted on said mast, gearing for operating said drum, also mounted on said mast, and flexible hoisting means connected with said drum and guided over idlers on said derrick arm.

6. The combination with a running gear, comprising front and rear axles, bolsters pivotally connected to said axles, and a sill pivotally connected to said axles and bolsters, of a trestle, and an arm adapted to have a detachable connection with said sill.

7. A running gear, comprising front and rear axles, a bolster pivotally connected to each axle, a supporting sill connected pivotally to the bolsters and axles, sockets on each bolster near their opposite ends, masts adapted to have an interchangeable and revoluble connection with the sockets on each of the bolsters, guy means for sustaining said masts in an upright position on said bolsters, a derrick arm connected to swing with each mast, a drum in connection with each mast, a support for said drum from the masts, gearing for operating said drums, also mounted on said supports, and flexible hoisting members connected with the drum and guided over idlers on the derrick arms.

8. A running gear, comprising front and rear axles, crossed rods connecting said axles, a bolster mounted on each axle, a supporting sill connected at its opposite ends centrally of said bolsters, a mast revolubly mounted on each bolster and capable of being detached therefrom, a derrick arm connected to each mast, raising and lowering means supported by said arm, and mechanism supported by said mast and rotatable therewith, for operating said raising and lowering means.

In witness whereof, I affix my signature in presence of two witnesses.

ARTHUR MARVIN.

Witnesses:

CHAS. W. LA PORTE,
LAURA E. CLAYPOOL.